Feb. 7, 1933.  H. N. BERRY  1,896,694
COTTON PICKER
Original Filed April 7, 1926  4 Sheets-Sheet 1
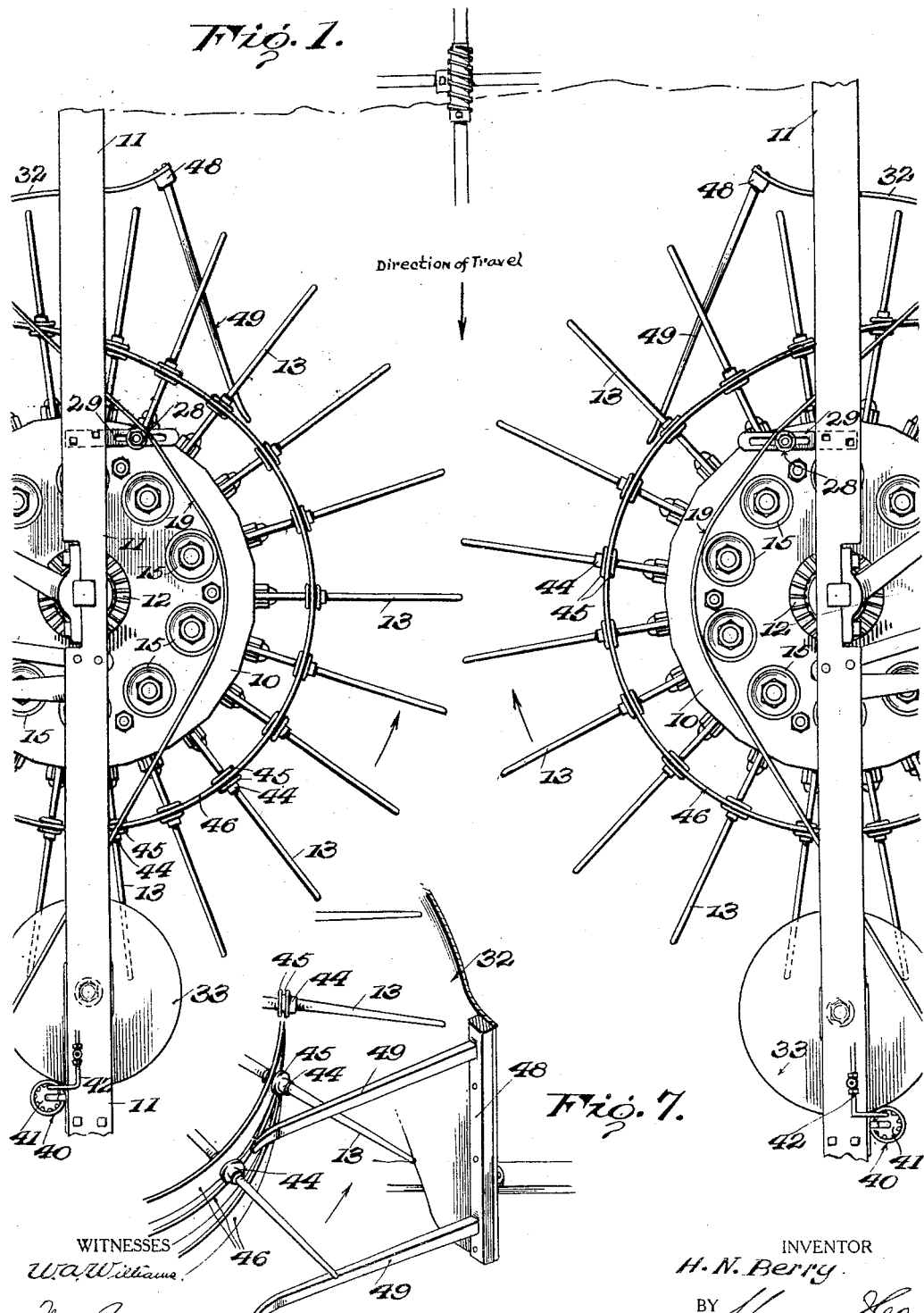

Feb. 7, 1933.  H. N. BERRY  1,896,694
COTTON PICKER
Original Filed April 7, 1926  4 Sheets-Sheet 2
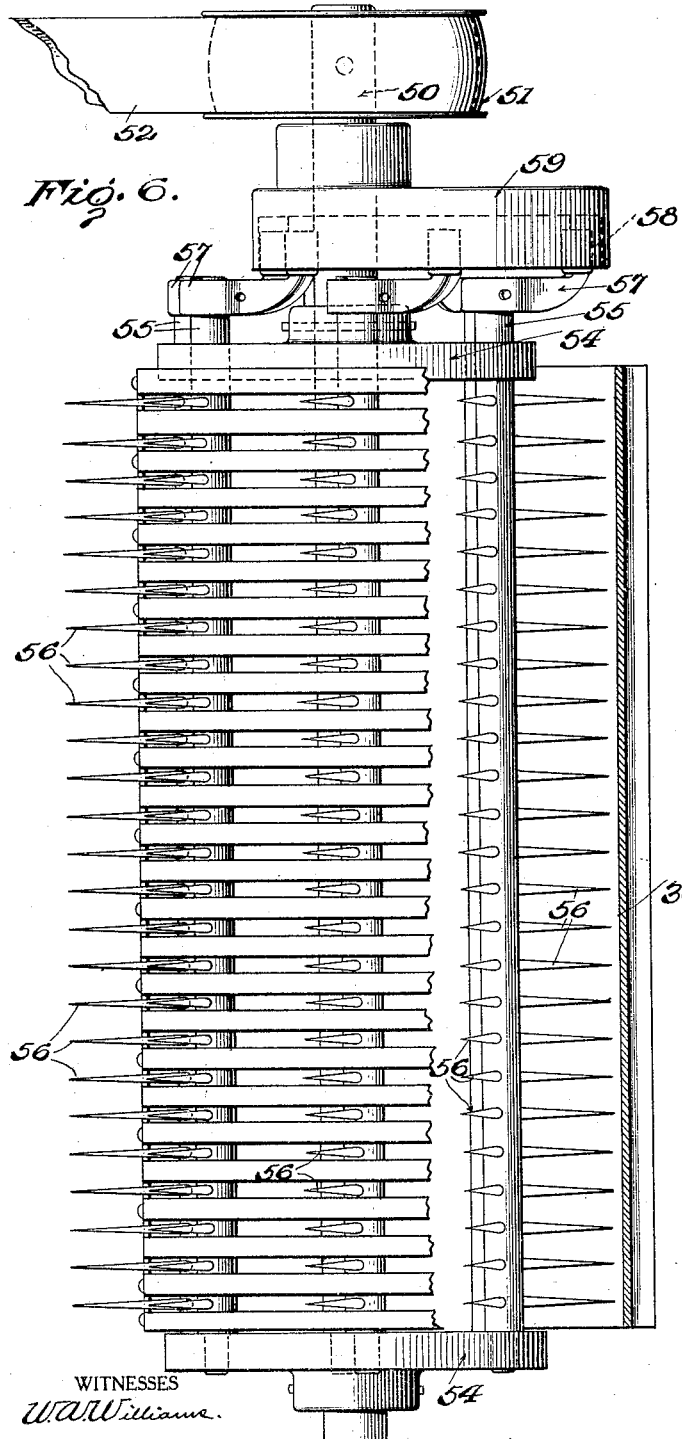
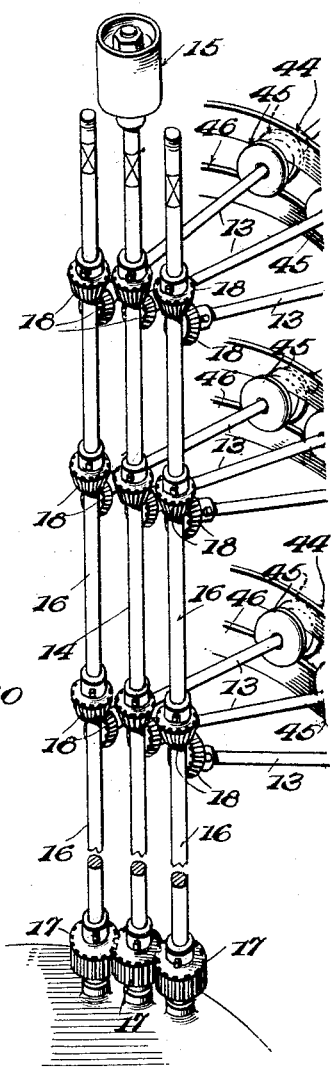

Feb. 7, 1933.  H. N. BERRY  1,896,694
COTTON PICKER
Original Filed April 7, 1926  4 Sheets-Sheet 3

INVENTOR
H.N.Berry

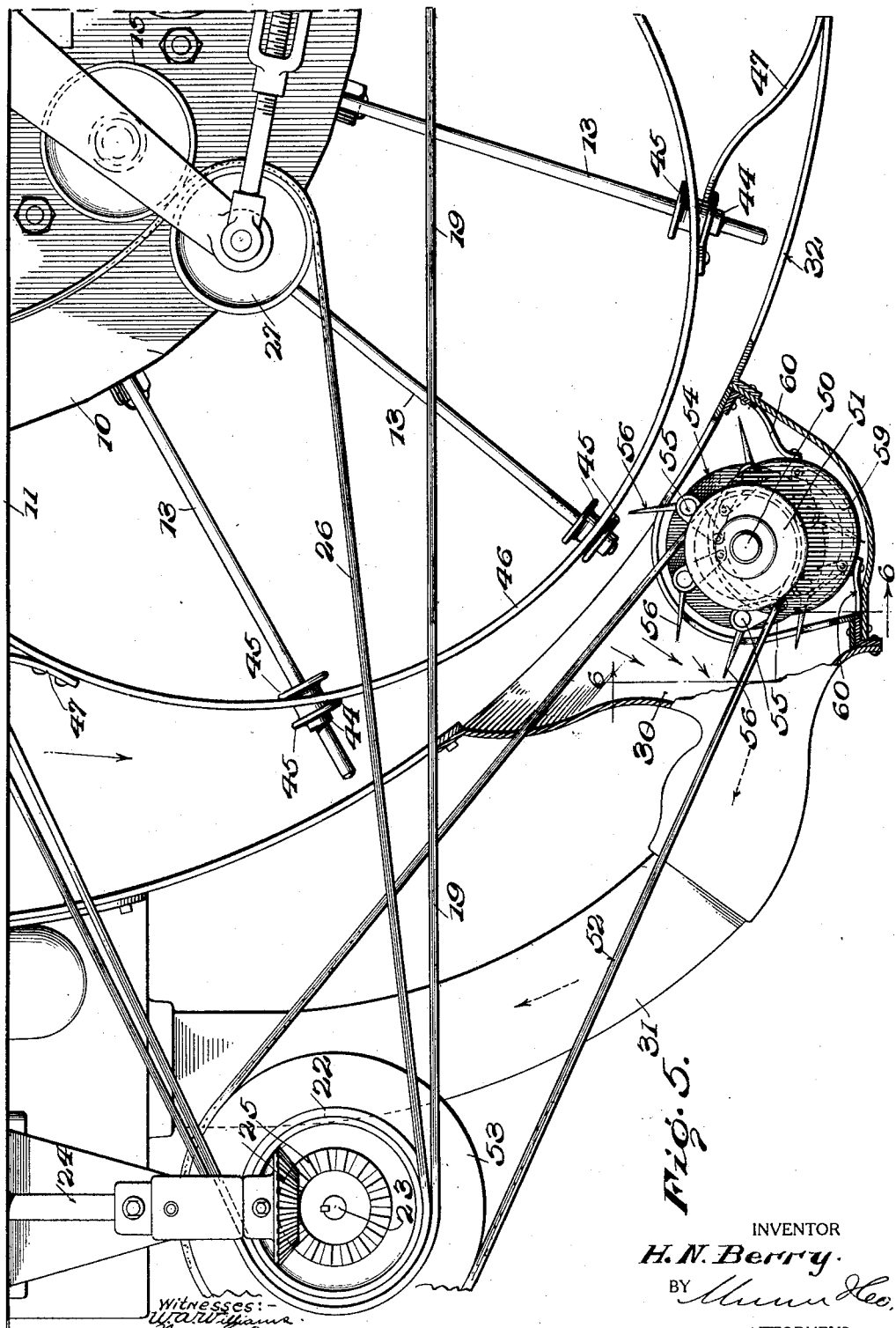

Patented Feb. 7, 1933

1,896,694

UNITED STATES PATENT OFFICE

HIRAM N. BERRY, OF GREENVILLE, MISSISSIPPI, ASSIGNOR, BY DIRECT AND MESNE ASSIGNMENTS, TO COTTON HARVESTER CORPORATION OF AMERICA, OF GREENVILLE, MISSISSIPPI, A CORPORATION OF DELAWARE

COTTON PICKER

Application filed April 7, 1926, Serial No. 100,438. Renewed June 28, 1932.

My present invention relates generally to cotton pickers, and more particularly to the revolving cylinder type of cotton picker, as included for instance in my Patent 1,530,151, granted March 17, 1925, and certain applications including application Serial No. 47,917, filed August 3, 1925, on which Patent 1,747,566 issued February 18, 1930, and application 81,341, filed January 14, 1926, on which Patent No. 1,742,493 issued on January 7, 1930, my primary object being the provision of certain improvements and refinements looking toward the general betterment of the apparatus from a practical commercial standpoint.

Among the various improvements presented in this application, my invention aims to bring forward a novel gearing within the cylinders whereby the same advantages in respect to the number of needles or picking fingers as permitted by the gearing arrangement in my patent above referred to, may be preserved and the vertical shafts of each group at the same time geared to one another at but a single point, thus avoiding the interengaging gears between the several picking fingers or needles of each group actuated by one vertical pulley shaft.

A second object of my present invention is the arrangement of the belts for driving the vertical shafts of the cylinders in such manner that it becomes easy to effect adjustments, whereby the picking fingers or needles may enter the plants before they start to rotate, together with means whereby the belts so arranged may be positively controlled to bring about this advantage.

A third object of my present invention is the provision of a new and improved oiling or moistening arrangement for the picking fingers, whereby during each revolution of the cylinders, the fingers before entering the plants, will be supplied with moisture for the purposes fully set forth in my two applications above referred to, and at the same time without danger of bending, displacing or otherwise injuring the more or less delicate picking fingers or needles.

A still further object of my invention is the provision of a novel form of stripping apparatus, or in other words a novel means whereby the cotton wrapped around the picking fingers or needles may be shifted lengthwise thereon to the extreme outer ends of the picking fingers or needles at one point in the rotation of the cylinders, in order to insure easy and complete removal of the cotton by a take-off device located at one point.

A still further object of the invetnion is the provision of a novel and improved take-off arrangement which will remove the cotton from the picking fingers or needles, and which will operate in such manner as to readily release the cotton so taken from the needles or fingers within the influence of suction utilized to convey the cotton taken off, to any suitable cotton receptacle.

Lastly, an object of my present invention is the provision of simple, effective means for the elimination of broken plants, twigs and the like from entanglement among the picking fingers or needles of the cylinders, and especially the prevention of movement of dried cotton stalks and the like around the cylinders to the positions where the cotton is taken off of the needles.

The various improvements of my invention thus generally outlined will be more thoroughly understood and better appreciated from the following description in detail of the several parts constituting the improvements, reference being had to the accompanying drawings which illustrate my present invention and form a part of this specification, and in which:—

Figure 1 is a top plan view illustrating the relative arrangement of two picking cylinders in effective relation in a cotton picker of the type to which my invention applies.

Figure 2 is a detail perspective view illustrating one of the vertical pulley shafts of the cylinders with associated parts constituting each internal mechanical group and including a series of picking fingers or needles driven thereby.

Figure 5 is an enlarged plan view partly broken away and in section of a portion of one of the cylinders, illustrating the associated cotton take-off mechanism.

Figure 6 is a vertical sectional view through the cotton take-off mechanism taken substantially on line 6—6 of Figure 5, and Figure 7 is a detailed perspective view of a portion of the apparatus illustrating in part the means to bring about the elimination of broken stalks, twigs, and the like from the picking cylinders or needles.

Figure 3:
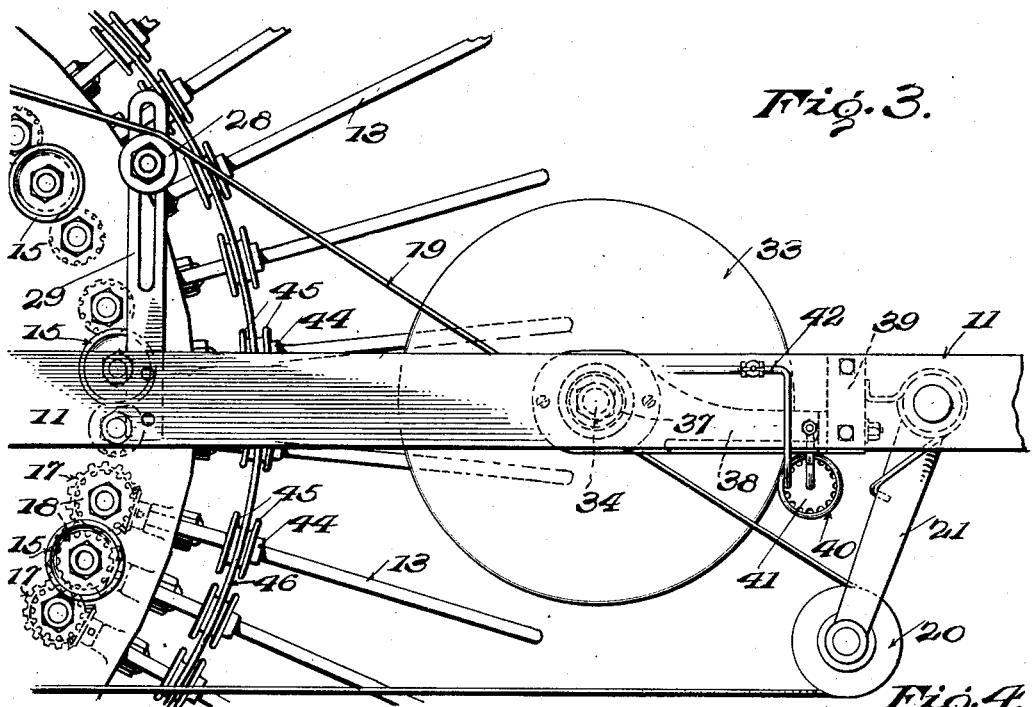
Figure 3 is a detail partial plan view showing more particularly the oiling or moistening arrangement or apparatus of one of the cylinders.

Referring now to these figures, and particularly to Fig. 1, I have shown in this figure in their practical relative relation, two laterally spaced picking cylinders 10, each rotatable upon portions of the frame of the machine which may include the parallel beams 11, and each actuated in practice in any suitable manner as for instance clearly set forth in my patent above referred to through connections engaging upper gears 12 of the cylinders.

Each of the cylinders has radiating from its surface a multitude of outstanding elongated and slightly tapering picking fingers or needles 13, and each of these picking fingers or needles must be rotated upon its own axis at a high rate of speed while within the cotton plants, or in other words, during the travel of the fingers or needles with the revolving cylinders along the space between the cylinders. In order to impart speedy rotation to the several needles upon their own axes, a plurality of vertical shafts are journaled within the cylinders 10, and these shafts are grouped in threes, the three shafts of one group being shown in Fig. 2. Of each group the central shaft 14 is extended at its upper end above the top of the respective cylinder and provided at this point with a pulley 15. The center shaft 14 and side shafts 16 of each group are connected to one another within the lower portion of the cylinder by spur gears 17, and each of the shafts is geared to its respective vertical line of picking fingers or needles by bevel gears 18 at spaced points in the lengths of the shafts.

In the above manner, it is provided that each of the pulleys 15 of which there is thus an annular series above each cylinder, drives three vertical lines of picking fingers or needles, and it will be noted from the arrangement shown and from a comparison of Figures 1, 3 and 5 that these pulleys 15 successively come in engagement in their movement with the revolving cylinders, with driving belts 19, or rather with the inner runs of these driving belts, each of the latter of which is extended around a forward guide roller 20 supported by a pivoted spring control arm 21 outstanding from one of the frame bars 11, forwardly of the respective cylinder.

Each belt 19 also extends at its rear portion around a driving pulley 22, the latter of which is mounted upon the upper portion of a shaft 23, as indicated in Fig. 5, and may be driven in practice through any suitable means including a cross shaft 24 and connecting bevel gears 25. The driving pulley 22 or a portion thereof may also have extended therearound a reversing belt shown at 26, which passes around pulleys 27, serving to hold a portion thereof so presented as to receive the shaft pulleys 15 thereagainst at the time when these latter pulleys are free of contact with their driving belt 19. From the fact as shown that the driving pulley 22 and guide roller 20 of each of the driving belts 19 are located at approximately diametrically opposite points of the respective cylinder 10, it becomes obvious that this arrangement lends itself not only to the driving of but a few of the several vertical shafts of the two drums at a time, but also lends itself to ready adjustment to control the exact points at which the picking fingers or needles in the course of their revolution with the cylinders shall commence to rotate upon their own axis. This becomes of especial importance since it has been found much more desirable that the needles or picking fingers start into the plants between the two cylinders in a stationary condition, and that their rotation be not started until they have actually entered the plants. In order to permit of effective adjustment in this respect, means may be employed including guide rollers 28 engaging the belts 19 forwardly or rearwardly of the points of engagement of the shaft pulleys 15 therewith, or both. These pulleys 28 may be adjustably mounted upon slotted brackets 29 projecting inwardly from the frame beams 11 at any point where it is desired to locate the guide pulleys for this purpose. It is obvious that after the cotton has become twisted upon the picking fingers or needles, as the same work through the plants, it is necessary to get this cotton off of the picking fingers, or needles during the period while the latter remain stationary or are reversed in their rotation as where the reversing belts 26 before mentioned are employed. To do this in the first place it is necessary that the cotton be pushed along the picking fingers or needles to their extreme outer ends, and then picked off of the ends of the fingers or needles by such means as will in practice deliver the cotton freely into the suction mouths 30 of the cotton suction conduits 31, these suction mouths flaring vertically from the conduits and being interposed as shown in Fig. 5 in practice, in a part of the shield 32 around the outer portion of each cylinder.

Figure 4:
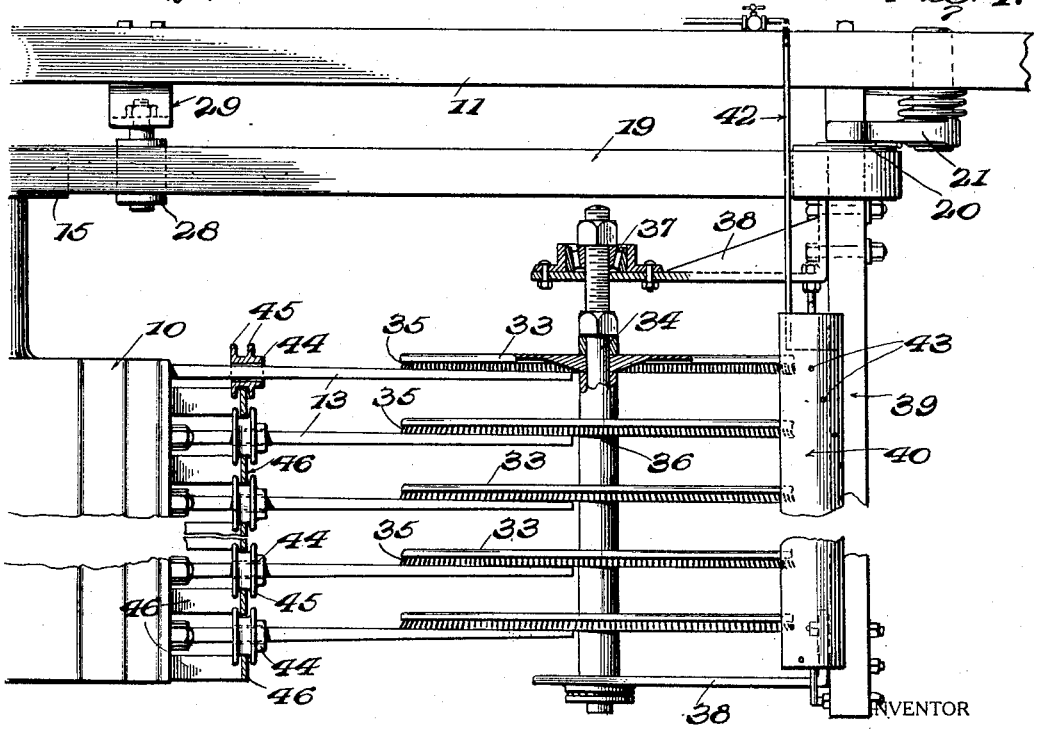
Figure 4 is a side view of the parts shown in Figure 3 partially broken away and in section.

It is also necessary in order that the picking fingers or needles properly pick the cotton, that these fingers be moistened, if as is contemplated the fingers or needles are employed with smooth surfaces, that is, without barbs. In Figs. 3 and 4 I have shown moisture applying means which, it will be noted in Fig. 1, occupy positions in advance of the two picking cylinders. According to my present improvements the moisture is applied to the needles by means of a series of approximately flat moisture applying disks 33 axially mounted upon a shaft 34, with which they are associated in the vertically spaced relation, particularly seen in Fig. 4, so as to bring each disk immediately above a horizontal row of picking fingers or needles. Each moisture applying disk has its lower surface provided with suitable moisture applying means, as for instance bristles 35, and the several disks spaced apart upon the shaft 34 as by means of thimbles 36 between the disks, turn freely with the shaft 34, the latter of which is revoluble in anti-friction bearings 37 at its upper and lower ends. These bearings are supported upon brackets 38, the latter outstanding from a supporting upright 39 depending from one of the frame beams 11.

The several moisture applying disks 33 moreover revolve with portions thereof overlying their respective rows of picking fingers and needles by virtue of their axial disposition upon shaft 34, the latter of which is mounted just beyond the ends of the fingers or needles. The moisture applying disks 33 also rotate with their peripheries in contact with a vertical cylindrical casing 40, around a peripherally fluted feed roll 41 substantially as in my Patent No. 1,742,493, above mentioned. Moisture, for instance castor-oil, is supplied through a feed line 42, into the upper end of the casing 40 above the feed roll 41 and travels downwardly in the grooves of the surface and this roll in order to communicate with and pass outwardly through feed openings 43 in the casing 40, opposite the several applying disks 33, each of the openings 43 communicating with its respective groove of the fluted feed roll.

Upon each of the several picking fingers or needles 13, a stripping thimble 44 is sleeved in such manner that the finger or needle is permitted to freely rotate within the thimble and the latter is just as freely slidable lengthwise of the needle. Each thimble 44 has a pair of spaced flanges 45, forming therebetween a circumferential groove. Between each horizontal row of picking fingers or needles a rigid stripping guide ring 46 is disposed and the vertical series of such guide rings are similarly and eccentrically shaped with respect to the cylinders 10 and disposed around the latter in spaced relation thereto. The eccentric shape of these guide rings cause the same to extend farther away from the surface of the cylinder at one point opposite the suction mouth 30, before mentioned. The several stripping guide rings 46 are supported by arms 47, extending inwardly between a portion of the shield 32 and the rings in alinement with the latter, and thus between horizontal rows of the picking fingers or needles, so that the stripping guide rings will thus be substantially held with their upper and lower edges in the grooves between the flanges 45 of the stripping thimbles 44.

Thus in the rotation of the cylinders the thimbles will be shifted inwardly and outwardly upon the picking fingers or needles by virtue of the fact that they are thus guided and controlled by the eccentric stripping guide rings 46. It will be noted from Figure 5 in particular, which shows portions of the stripping guide rings 46 and the supporting arms therefor from the shield 32, that the rings 46 are so shaped as to push the cotton to the extreme ends of the picking fingers or needles at a point opposite the central portion of the flared and enlarged suction mouth 30 of the suction pipe of each cylinder.

It is furthermore obvious that the stripping guide rings 46 not only serve the function above mentioned, but that they also serve a further function for which I previously utilized flexible belts in my Patent No. 1,742,493, above mentioned, namely, to prevent accidental passage of cotton from those portions of the picking fingers or needles outwardly beyond the stripping thimbles to those portions inwardly beyond the thimbles where it would be difficult to remove the cotton.

As the cotton is carried rearwardly around the cylinders upon the picking fingers or needles and gradually shifted outwardly along the needles for removal from the latter at the suction mouth of the suction tube, it is very important that nothing interfere with the effectiveness of this operation and it is highly important that any sticks or broken portions of brittle cotton stalks or stems be eliminated from between the needles. Frequently when it is necessary on account of wet condition of the soil to put off the picking of cotton, the stalks become dry and brittle and are inclined to break and portions thereof pass with the cotton adhering to the picking fingers or needles. In order to eliminate such stalks and stems, I propose that the rear upright edges of the shields 32 be provided with vertical supporting bars 48, from which guard arms 49 extend, as shown in Figures 1 and 7, forwardly and inwardly at angles between the horizontal rows of picking fingers or needles 13 to points adjacent to the stripping guide rings 46. Thus any sticks or stems passing rearwardly with the picking fingers or needles will encounter guard arms 49 and will be eliminated by the latter, due to the tendency of the sticks to slide along the guard arms out of the spaces between the picking fingers or needles.

In order to take the cotton off of the ends of the picking fingers or needles I employ an arrangement at the suction mouth adjacent to each cylinder as shown in Figures 5 and 6, which arrangement includes an upright shaft 50 having secured upon its upper end a pulley 51 driven by means of a belt 52, from a pulley 53 on the shaft 23 before mentioned. Upon the upper and lower portions of shaft 50 are secured a pair of circular bearing plates 54 and in these bearing plates are journaled the upper and lower end portions of a circumferential series of shafts 55, having thereon a vertical series of horizontally outstanding alined spurs 56. The series of shafts 55 and the bearing plates 54 thereof revolve with the shaft 50 and the upper ends of the several shafts 55 are provided with angularly disposed cranks or arms 57 terminating in roller mounted upstanding extensions 58 projecting into the lower annular groove of an eccentric 59 supported in any suitable manner within the suction mouth 30, as by means of supporting arms 60. The relation of this eccentric 59 with the revolving shaft 50 is such that as the several shafts 55 revolve around the shaft 50 they will be shifted on their own longitudinal axis to vary the angularity of the spurs 56 of the shafts in relation to the two features in connection with which the take-off operates. Thus as the several shafts successively come into proximity to the ends of the picking fingers or needles they will be inclined at such an angle as shown in Fig. 5, as to enter the tufts of cotton at that time upon the ends of the fingers or needles, and in this way secure a sufficient grasp of the cotton tufts so that in the further revolution of the take-off device the cotton will be effectively and fully removed from the ends. On the other hand, however, as the take-off device continues to revolve and the shafts 55 successively pass the center line of the suction conduit or tube 31, the spurs will be shifted so as to substantially aline their longitudinal axis with the said center of the conduit or tube 31, thus making it especially easy for the suction to pull the cotton lengthwise off of the spurs. This mechanism has been found especially effective for the purposes for which it is intended and constitutes it should be noted a substantially important feature of the invention, it being obvious that the effectiveness of the take-off depends to a great extent upon its complete release of the cotton into the suction conduit. Furthermore, the effectiveness of the picking operation, that is the operation of the picking fingers or needles upon the cotton plants, depends to a great extent upon the effectiveness of the take-off device or mechanism so that all of the teeth or fingers as they go into action between the picking cylinders will be in a clean efficient state.

I claim:—

1. In a cotton picker, a revolving picking cylinder, picking fingers radiating from the said cylinder, vertical shafts in an annular series around and within the cylinder, each shaft being geared at vertically spaced points therealong to the picking fingers in vertical line therewith, said shafts being arranged in groups, gearing connecting the shafts of each group, one shaft of each group having an extended pulley, and driving connections for rotating the shafts during revolution of the cylinder and including a belt with which the pulleys of the shafts are movable into and out of engagement.

2. In a cotton picker, a revolving picking cylinder, picking needles radiating from said cylinder and arranged in vertical and horizontal lines, vertical shafts in an annular series within and around the cylinder, and each corresponding to and geared with one vertical line of picking fingers, gears connecting the lower end portions of the said shafts in groups, of which one shaft of each group has an upwardly extended pulley, and means engageable with the said pulleys whereby to drive a series of vertical lines of picking fingers from each pulley.

3. In a cotton picker including vertically disposed revolving picking cylinders in laterally spaced relation, an annular series of vertical shafts rotatable in and projecting above each of said cylinders, picking fingers radiating from the cylinders and having geared connections with the vertical shafts for rotating the fingers upon their individual axes, means for actuating the several shafts during rotation of the cylinders and adjusting means for controlling the start and duration of rotation of the fingers, said actuating means including belts and actuating pulleys on the shafts, and driving and guide rollers over which the belts travel arranged approximately at diametrically opposite sides of the cylinders and said adjusting means including guide rollers engaging the belts between the actuating pulleys of the shafts and the driving and guide rollers of the belts.

4. In a cotton picker including vertically disposed revolving picking cylinders in laterally spaced relation, an annular series of vertical shafts rotatable in and projecting above each of said cylinders, picking fingers radiating from the cylinders and having geared connections with the vertical shafts for rotating the fingers upon their individual axes, and means for actuating the several shafts during rotation of the cylinders, said means including belts and actuating pulleys on the shafts, driving and guide rollers over which the belts travel arranged approximately at diametrically opposite sides of the cylinders, and means also engaging said belts to guide the same and control the start and duration of rotation of the fingers.

5. In a cotton picker, a revolving picking cylinder, picking fingers radiating from and revolving with the cylinder, shafts mounted in an annular series around and within the cylinder and geared to the picking fingers, pulleys upon the upper ends of said shafts, a belt around the upper portion of the cylinder having one side thereof engageable with the shaft pulleys at one side of the cylinder, and guide rollers for the said belt located at approximately diametrically opposite sides of the cylinder, and a supplemental guide roller having an adjustable support and engaging the pulley actuating side of the belt whereby to regulate the point of initial engagement between the pulleys and the belt, as described.

6. In a cotton picker, a revolving picking cylinder, picking fingers radiating from and revolving with the cylinder and arranged in horizontal rows, and means for moistening the picking fingers during revolution of the cylinder, including a vertical shaft revolubly mounted beyond the ends of the fingers, a series of flat disks axially disposed on and rotatable with the said shaft and arranged to extend partially between the horizontal rows of picking fingers, each of said disks having moisture applying means in engagement with the adjacent row of needles, and means for feeding moisture to the said applying disks.

7. In a cotton picker, a revolving picking cylinder, picking fingers radiating from and revolving with said cylinder and arranged in horizontal rows, a vertical revolving support beyond the ends of the fingers, a series of moisture applying disks rigidly mounted in vertically spaced relation upon the said support, said disks extending inwardly between the horizontal rows of picking fingers and having moisture applying means for contact with the fingers, and means for supplying moisture to the said disks for distribution through the latter to the picking fingers.

8. A cotton take-off device for a picking cylinder having picking fingers and a suction mouth adjacent to the cylinder, said device including a series of rotatable spur shafts, means for revolving the said shafts as a series, and means for rotatably adjusting the spur shafts, during the revolution and presenting the same at angles to the picking fingers as they pass the latter so as to dig endwise into the cotton and presenting the same in axial alinement with the suction mouth as they pass the said suction mouth so as to permit the cotton to be readily drawn off the spurs by suction.

9. A stripping device for a cotton picking cylinder having outstanding picking needles, consisting of stripping thimbles sleeved on the needles, and stationary members of an eccentric nature in the several spaces between horizontal rows of said needles each member movably engaging the thimbles above and below the same to shift the thimbles inwardly and outwardly upon the needles during revolution of the cylinder.

10. A stripping device for a cotton picking cylinder having outstanding picking fingers, consisting of stripping thimbles sleeved on the fingers and shiftable lengthwise of the latter, and stationary eccentric guide rings around the cylinder in the several spaces between horizontal rows of fingers, the upper and lower edges of each ring engaging and cooperating with the thimbles above and below the ring to shift the thimbles inwardly and outwardly upon the fingers during revolution of the cylinder.

11. A stripping device for a cotton picking cylinder having outstanding picking fingers, consisting of stripping thimbles sleeved on the said picking fingers and shiftable lengthwise thereof, said thimbles having annular grooves, and a plurality of stationary eccentric guide rings around the cylinder and in the several spaces between horizontal rows of fingers, each ring having its upper and lower edges extending into the grooves of the thimbles above and below the same, for the purpose described.

12. In a cotton picker including a revolving picking cylinder, a plurality of rotatable picking fingers arranged in vertical lines, a plurality of vertical shafts, each shaft opposite one vertical line of picking fingers, and geared at spaced points there-along to the fingers of its respective line, the shafts being connected in groups of three around the cylinder, the shafts of each group being geared to one another at one point independent of the geared connections with the fingers, one shaft of each group having a pulley upon its upwardly extended end for engagement by a belt.

13. A cotton picker including a revolving picking cylinder provided with a plurality of rotatable picking fingers radiating therefrom, groups of vertical shafts actuating said picking fingers one shaft of each group having a pulley upon its upwardly extended end for engagement by a belt, means for the guidance of said belt comprising main guide rollers at approximately diametrically opposite points beyond the picking cylinder, and an adjustable supplemental guide roller engaging each belt between the shaft pulleys and the said main guide rollers for regulating the exact time the picking fingers begin to rotate after entering the plants.

14. A cotton picker including a revolving picking cylinder, a plurality of rotatable picking fingers radiating from said cylinder, means for moistening said fingers including a series of flat horizontal rigid discs fixed at spaced points upon a vertical shaft beyond the ends of the fingers of the cylinder and arranged to partially extend between the horizontal rows of fingers, each disc having moisture applying means attached to the lower surface thereto to moisten the next lowermost row of fingers.

15. In a cotton picker including a revolving picking cylinder, a plurality of rotatable picking fingers radiating from said cylinder, means for stripping the cotton fibers along said fingers including stripping thimbles sleeved on the several fingers to rotate thereon and to move lengthwise thereof, these thimbles being circumferentially grooved and controlled and actuated by rigid eccentric members disposed between the horizontal rows of fingers so that their upper and lower edges extend into the grooves of the thimbles thereabove and therebelow.

16. In a cotton picker including a revolving picking cylinder, a plurality of rotatable picking fingers radiating from said cylinder, means for removing the cotton fibers from said fingers, said means including an annular series of vertical rotatable shafts having spurs thereon in line with the horizontal rows of fingers together with means for controlling and oscillating the spur shafts during their rotation so that they sweep angularly past the finger ends and from which the spurs take the cotton and then shift to a position wherein they are axially alined with the pipe of a suction mouth whereby the cotton is drawn endwise from said spurs by the suction of said suction mouth.

17. In a cotton picker including a plurality of spaced revolving picking cylinders, a plurality of rotatable picking fingers radiating from each cylinder, means for eliminating from the mechanism broken portions of the cotton plants, said means including an arrangement of a vertical series of guard arms at spaced points between the fingers of each cylinder and inclined forwardly and inwardly so that the broken portions of the plants will slide rearwardly along the guard arms out of range of the picking fingers during the rotation of the cylinders, thus preventing entanglement by the passage of the broken portions of the plants to the point of removal of the cotton fibers from the fingers.

HIRAM N. BERRY.